April 28, 1970   W. N. FILATOV   3,508,521
BALANCE WEIGHT FOR INSTRUMENT POINTER ARM
Filed June 18, 1965
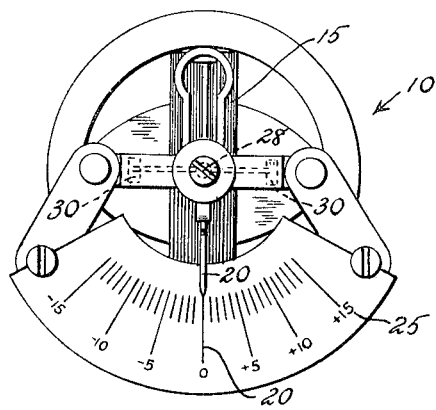
Fig.1
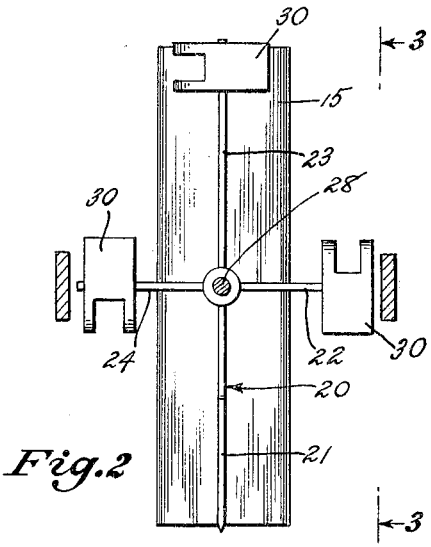
Fig.2
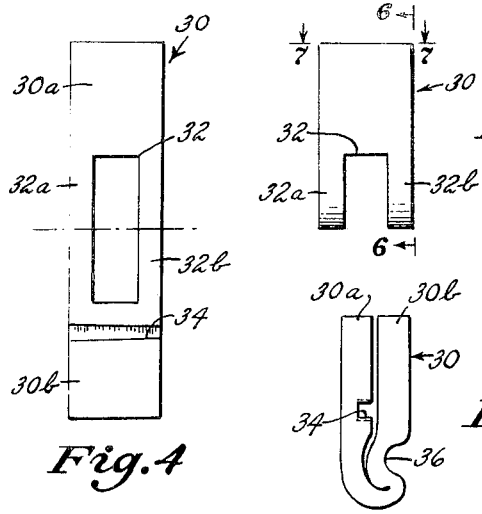
Fig.4   Fig.5   Fig.6
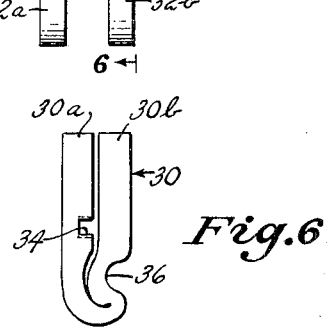
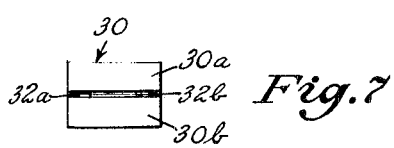
Fig.7
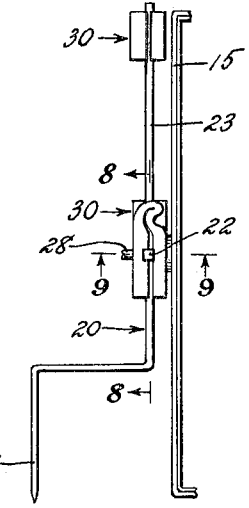
Fig.3
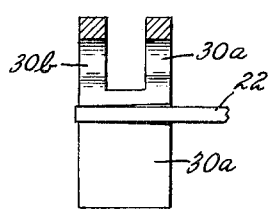
Fig.8
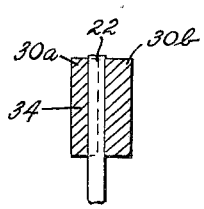
Fig.9

United States Patent Office 3,508,521
Patented Apr. 28, 1970

3,508,521
BALANCE WEIGHT FOR INSTRUMENT
POINTER ARM
Wladimir N. Filatov, 166 Woodland St.,
Windsor, Conn. 06095
Filed June 18, 1965, Ser. No. 464,988
Int. Cl. G01d 11/08
U.S. Cl. 116—136.5                                5 Claims

ABSTRACT OF THE DISCLOSURE

A slideably-adjustable balance weight, for static and dynamic balancing of the movable pointer of a meter instrument, in the form of a rectangular metal strip folded in half and crimped at the fold to provide a spring hinge, with an interior channel adapted to receive an arm element of the pointer.

---

The present invention relates to a balance weight for use in static and dynamic balancing of the movable pointer assembly of the meter mechanism of precision electrical meausring devices.

In sensitive electrical measuring instruments, such as millivoltmeters, microammeters, and the like, the precision balancing of the pointer assembly of the meter movement is a matter of great criticality since even the slightest static or dynamic imbalance of the pointer about its pivot post will produce significant changes in the meter reading when the instrument is placed at various angles. Accordingly, great care is taken in the construction of such meters to insure that the movable pointer assembly is balanced as accurately as possible in order to minimize this source of error in the meter reading.

Conventionally, tiny coil springs are used as balance weights for the pointer assembly of such devices which is typically provided with a plurality of opposed support arms formed in a cross arrangement. During the balancing adjustment a coil spring is placed over each of the pointer arms and slid along its respective arm until the desired conditions of static and dynamic balance are achieved.

As it is not practical to make these coil springs of uniform diameter, it is necessary to apply a dab of cement as a bonding medium to each of the springs in order to permanently hold it at a preselected position on the pointer arm. However, as the cement dries, there is a loss of moisture therefrom which causes a decrease in the effective weight of each of the balance springs. Since the amount of moisture loss is depend upon the amount of cement applied initially, as well as the manner in which it is distributed on each of the springs, the resulting weight loss varies among each of the individual balance springs on the pointer arms. Consequently, this produces a change in the weight distribution among the arms of the pointer, and this slight inequality may oftentimes be sufficient to offset the balance of the meter mechanism enough to produce a significant error in the meter reading.

The new and improved balance weight design of the present invention overcomes the above-described problem as well as other shortcomings of conventional coil springs. In a principal embodiment the balance weight of the present invention is in the form of a tiny metal clip which is designed to fit onto the respective arms of the pointer element. During the balancing adjustment the clip can be easily slid to any desired position on the pointer arm; however, afterwards the clip will hold securely at this position by means of spring tension alone. As the clip is designed to hold its position without the need of any auxiliary bonding medium, the weight of each of the pointer arms will remain constant. Accordingly, once the clips have been positionally adjusted for static and dynamic balance of the pointer assembly, the pointer element will remain in balance indefinitely and this source of error effectively eliminated from the meter mechanism.

It is therefore a principal objective of the present invention to provide a balance weight of new and improved design for the pointer element of the meter movement in an electrical measuring instrument.

It is another principal objective of the present invention to provide a balance weight for the above described purpose which may be readily adjustable to any desired position on a support arm of the pointer element during the initial balancing thereof, but which will afterwards remain securely affixed to such position without the need of any auxiliary bonding medium.

Other novel features, objectives, and advantages of the present invention will be apparent from the following detailed description of a preferred embodiment taken in conjunction with the appended drawings in which:

FIG. 1 is a plan view of the meter mechanism of an electrical measuring instrument of the permanent-magnet moving-coil or D'Arsonval type, showing the environment in which the present invention may be advantageously employed.

FIG. 2 is an enlarged plan view of only the pointer assembly of the meter mechanism shown in FIG. 1, with clips designed according to the present invention attached to the arms thereof as balancing weight.

FIG. 3 is a side view showing the balance weight of the present invention affixed to the arms of the pointer assembly, as seen along the line 3—3 in FIG. 2.

FIG. 4 is a greatly enlarged plan view of the balance weight of the present invention shown in an intermediate stage of fabrication.

FIG. 5 is a plan view of the balance weight shown in FIG. 4 after fabrication has been completed.

FIG. 6 is a side view of the balance weight, as seen along the line 6—6 of FIG. 5.

FIG. 7 is a top view of the balance weight, as seen along the line 7—7 of FIG. 5.

FIG. 8 is a sectional view of the balance weight of the present invention affixed to an arm of the pointer assembly, as taken along the line 8—8 of FIG. 3.

FIG. 9 is a cross-sectional view of the balance weight affixed to an arm of the pointer assembly, as taken along the line 9—9 of FIG. 3.

Referring now to the figures, FIG. 1 shows the meter mechanism, indicated generally as 10, of a conventional electrical measuring instrument having a movement of the D'Arsonval type. The type of meter mechanism is merely exemplary of one of many applications in which the balance weight of the present invention may be advantageously employed, as it may also be used with the electrodynamometer as well as other types of meter movements.

In a permanent-magnet moving-coil or D'Arsonval movement, the magnitude of the current flow is measured by passing it through a multiturn coil of fine wire 15, pivoted to turn in the air gap of a fixed permanent magnet (not shown). The flow of current in the presence of a magnetic field produces a torque due to electrodynamic action which causes rotary movement of the coil 15, in a direction determined by the polarity of the current flow, and a consequent deflection of the pointer arm 20 from the zero or quiescent position shown in FIG. 1 to a new position determined by the opposing torque developed by the control springs of the meter movement. The amount of deflection of the pointer 20, as represented by the reading of the indicia on the meter scale 25, ideally corresponds to the amplitude of the current flowing through the coil windings, and thus the meter reading is indicative of the parameter measured by the instrument. As is well understood by those skilled in the art, in a meter movement of the D'Arsonval type, the amount of pointer deflection is proportional to the average or D.C. value of the current flowing through the meter; whereas, in a meter movement of the electrodynamometer type, with which the balance weight of the present invention may also be used with advantage, the deflection of the meter pointer 20 is theoretically proportional to the effective or R.M.S. value of the current flowing through the meter.

As has been heretofore explained, it is desirable, if indeed not essential, in precision electrical measuring instruments of the types described above, to minimize any source of error in the meter movement, so as to insure that the actual pointer deflection corresponds as nearly as possible to the theoretical ideal, regardless of the orientation of the instrument. To this end, it is essential that the pointer assembly 20, which is comprised of the pointer arm 21 and a set of three support arms 22, 23 and 24 formed into a cross configuration, be critically balanced atop its central pivot support 28 which is connected to the rotary coil 15. As is best shown in FIGS. 2 and 3, the balance weights of the present invention, indicated generally as 30, are positioned at points, determined by careful adjustment, on each of the respective support arms 22, 23 and 24 so as to provide dynamic as well as static balancing of the pointer assembly—a result which minimizes errors due to changes in the vertical orientation of the instrument. (It will be understood that conventional techniques may be employed during the assembly of the meter mechanism to test for and achieve the desired state of balance of the pointer assembly by the adjustable positioning of these balance weights 30.)

As is best shown in FIGS. 4–9, which are views on a greatly enlarged scale, the balance weight 30 of the present invention is exemplarily in the form of a tiny metal clip, preferably of cooper, which may be formed in the following manner: From a flat, rectangular strip having the exterior dimensions shown in FIG. 4, a rectangular central section 32 is punched out, and a horizontally-running groove 34, of generally rectangular cross-section, corresponding to the cross-sectional dimensions of the support arms 22–24 of the pointer assembly, is then cut in the lower half 30b of the strip as shown. In some embodiments the groove 34 may be formed instead, with a strip of sufficient thinness, by crimping the metal within a suitable die. The strip 30 is next folded over on itself, as is best shown in FIGS. 5 and 6, and a crimp 36 is next made with a suitable crimping tool in the folded-over marginal regions 32a and 32b bordering the sides of the cutout 32.

By virtue of the crimp made in the regions 32a and 32b at the fold of the metal strip 30, a hinge-like spring action is produced therein which urges the respective halves 30a and 30b of the strip together. It will therefore be seen that, when the metal clip 30 is placed on any one of the support arms 22, 23 or 24 of the pointer assembly, the spring force exerted by the sides of the clip, and acting on the arm member interposed in the groove 34, will serve to firmly hold the clip at any desired position along the length of the suport arm.

It has been found that, in order for the balance clip to be slidably adjustable with a minimum of difficulty to any desired position along the support arm of the pointer assembly, while still maintaining the desired degree of spring action once the sliding force is removed, it is preferable that the pressure produced by the spring action of the clip be confined to as small a surface of the support arm as possible. To this last-mentioned end, the horizontal groove 34, which is cut in the lower half 30b of the strip 30 during the fabrication process (see FIG. 4), should be of slightly varying dimension so that the rectangular opening, which is formed in the finished strip (see FIG. 6), is slightly larger on one side of the clip than on the other (see FIG. 8).

Furthermore, when the clip 30 is slid onto a support arm of the pointer assembly, it should preferably be inserted with the side having the larger cross-sectional opening facing inwardly toward the pivot point 28. Such procedure will ensure that the balance clip 30 can be easily slid inwardly along the support arm, as required during the balancing adjustment process, while permitting the clip to lock firmly to the arm by spring tension alone, once the desired balancing adjustment is completed.

The terms and expresions which have been employed here are used as terms of description and not of limitation, and there is no intention, in the use of such terms and expresions, of excluding equivalents of the features shown and described, or portions thereof, it being recognized that various modifications are possible within the scope of the invention claimed.

What is claimed is:

1. A balance weight, for use in the balancing of the pointer assembly in a moving-coil meter mechanism of the type described, comprising, a rectangular metal strip folded over in half and crimped at the fold to provide a spring hinge urging said folded halves together, and a groove formed on an inner surface of said folded strip and running substantially parallel to the line of said fold, said groove being adapted to receive therein an interposed arm element of said pointer assembly, whereby said folded strip may be forcibly slid along the length of said arm element to any desired position and then will be held securely thereto by friction alone once said sliding force is removed.

2. A balance weight as set forth in claim 1 further characterized in that said groove is of uniformly varying dimension, proceeding from one end to the other, so that the spring pressure acting on said interposed arm element is more concentrated.

3. A balance weight providing a concentrated adjustable mass for the movable crossarm of an instrument comprising a unitary, generally flat strip of spring metal folded to provided a pair of hinged confronting platens, the spring tension of said hinge acting to oppose separation of said platens, one of said platens having an open channel extending thereacross substantially parallel to said hinge, the depth of said channel being shallower than the thickness of said crossarm upon which said balance weight is to be stationed; and the open side of said channel facing the confronting platen.

4. A balance weight according to claim 3 wherein the hinge of the confronting platens comprise a pair of dependent feet of thickness less than said platens.

5. A balance weight according to claim 4 wherein said channel flares outwardly at one end thereof to facilitate insertion onto an end of said crossarm.

References Cited

UNITED STATES PATENTS

| | | | |
|---|---|---|---|
| 1,070,683 | 8/1913 | Hale | 24—209 |
| 1,155,095 | 9/1915 | Porter | 116—136.5 |
| 3,302,606 | 2/1967 | Vacha | 116—136.5 |

LOUIS J. CAPOZI, Primary Examiner

U.S. Cl. X.R.

324—154